May 2, 1933. P. SPENCE 1,906,651
REGULATING VALVE
Filed May 29, 1929 3 Sheets-Sheet 1

INVENTOR
Paulsen Spence
BY
ATTORNEYS

May 2, 1933.  P. SPENCE  1,906,651
REGULATING VALVE
Filed May 29, 1929    3 Sheets-Sheet 2

May 2, 1933. P. SPENCE 1,906,651
REGULATING VALVE
Filed May 29, 1929 3 Sheets-Sheet 3

INVENTOR.
Paulsen Spence
BY
ATTORNEYS.

UNITED STATES PATENT OFFICE

PAULSEN SPENCE, OF ORANGE, NEW JERSEY

REGULATING VALVE

Application filed May 29, 1929. Serial No. 366,838.

My invention relates to a regulating valve.

It is an object of the invention to provide an improved regulating valve by means of which fluid pressures may be regulated with great accuracy, and a relatively small differential pressure maintained between the high and low pressure sides.

It is a more specific object to provide a regulating valve in which there will be substantially no chattering or hunting of the valve member.

It is a further object to provide a regulating valve in which the diaphragm or other control member is substantially balanced and a light spring employed for moving the valve.

It is another object to provide a regulating valve in which low pressure fluid is employed for seating the valve, and which may be regulated from a remote control.

Other objects and structural and functional features of advantage will be apparent as the specification proceeds.

In the drawings which show, for illustrative purposes only, preferred forms of the invention—

Fig. 3 is a detail sectional view of a relief valve;

Figure 1:
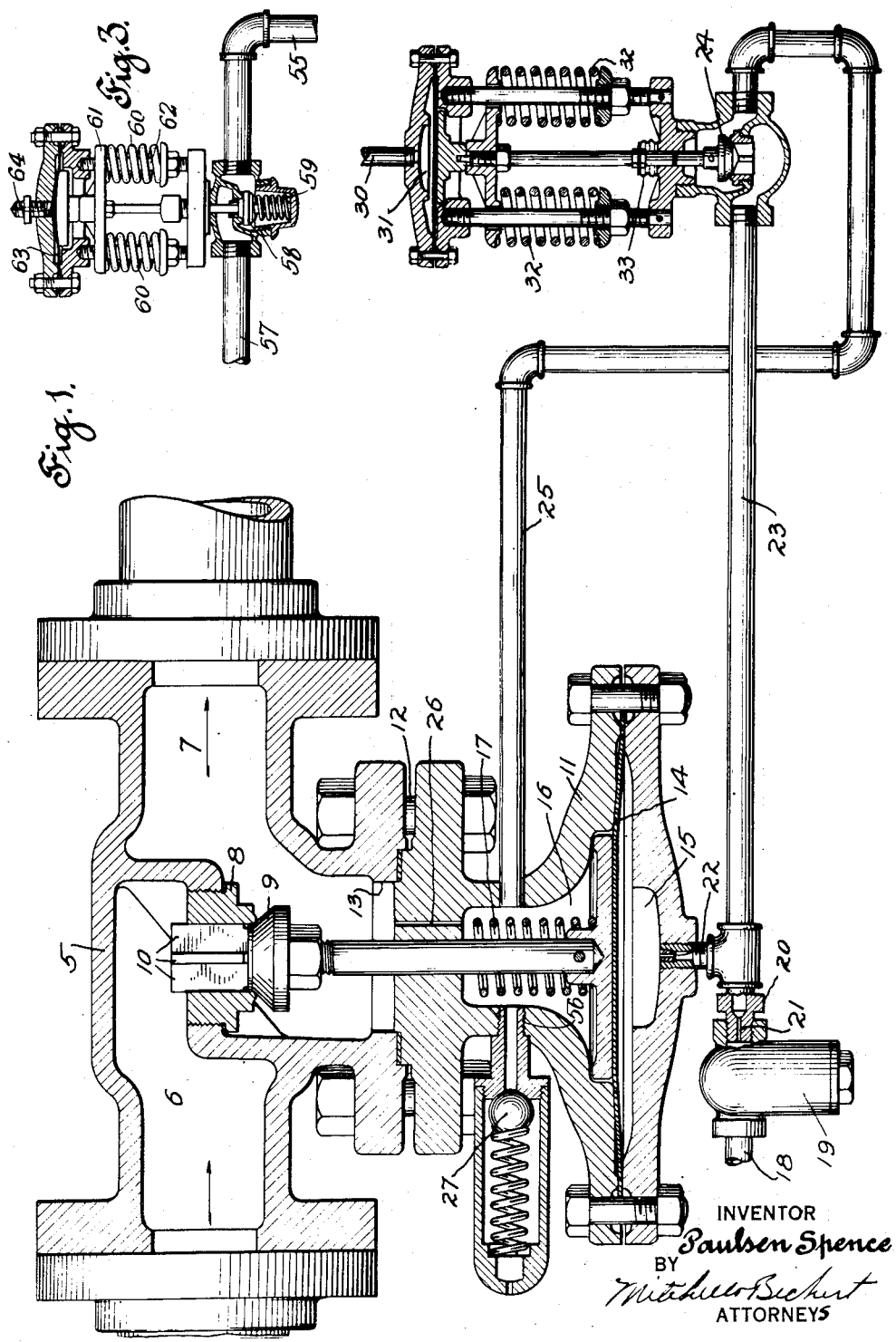
Fig. 1 is a sectional view of a regulating valve illustrating features of the invention.

In the valve illustrated in Fig. 1, 5 indicates a valve casing having a high pressure side 6 and a low pressure side 7 with a communication through the seat member 8. The valve member 9 cooperating with the seat 8 controls the flow of fluid from the high to the low pressure sides of the valve casing. In the form shown, the valve 9 is provided with guide wings 10 slidable in a bore through the seat member for guiding the valve and preventing any binding action.

The valve 9 is moved under the influence of fluid pressure means preferably in the form of a diaphragm. As illustrated, a diaphragm casing 11 is secured to the valve casing 5 as by means of bolts 12. The opening 13 through the valve casing when the diaphragm casing is removed, is preferably of such size that the valve 9 may be removed therethrough, and the valve seat 8 after being loosened from the partition wall in the valve casing may also be removed through the opening. This construction facilitates inspection and repair of the valve. The diaphragm casing is divided by a diaphragm 14 into a high pressure diaphragm chamber 15 and a low pressure diaphragm chamber 16. A spring 17, which, for reasons to be later described, may be of very light construction, may be employed for moving the valve 9 away from its seat.

A high pressure fluid line 18 connects to a strainer 19 to which in turn is connected a fitting 20 having a small bleed port 21 therethrough for permitting a very limited supply of high pressure fluid to pass. High pressure fluid after passing through the bleed opening 21 is free to enter the high pressure diaphragm chamber 15 through a suitable connection such as the nipple 22. When the valve 9 is in open position, the high pressure fluid passing through the bleed port 21 passes through the pipe 23, past a control valve 24, thence through the pipe 25, and into the low pressure diaphragm chamber 16. Fluid entering the chamber 16 through the pipe 25 is bled out of the chamber to a region of lower pressure. In the form shown, a bleed port 26 serves to bleed fluid from the chamber 16 into the low pressure side 7 of the valve casing.

A relief valve 27 serves to determine the maximum pressure within the low pressure diaphragm chamber 16. The pressure at which the relief valve 27 opens may, of course, be regulated by suitably adjusting the valve 27, as is common practice in the relief valve art.

The control valve 24 may be actuated by any suitable means from a remote point and the control valve itself may be located remote from the main valve 5. In the form illustrated, I show a simple pressure regulated means for closing the valve 24. A pipe 30 conducts fluid to a diaphragm chamber 31, and when the predetermined pressure is attained the diaphragm is depressed and the valve 24 closed against the compression springs 32—32. A sylphon or bellows type of seal 33 may be secured to the stem of the valve 24 and to the valve casing so that the valve 24 may have a very free action and be subject to a very delicate control due to variations in pressure in the diaphragm chamber 31. The control pipe 30 may, of course, be connected to the low pressure side 7 of the valve casing, or may be connected to any other source of pressure which may be desired to actuate the control valve. Since the valve 24 is merely a control valve it may be actuated manually or by any other means such as a solenoid or the like as is common in the valve art.

The operation of the regulating valve is as follows:

Assuming the valve 9 to be open, high pressure fluid will flow from the high pressure side 6 to the low pressure side 7. During this time the control valve 24 will be in open position and high pressure fluid passing through the bleed port 21 will be exhausted through the control valve 24 and into the low pressure diaphragm chamber 16. The bleed port 26 is preferably of about the same size as the bleed port 21 so that the pressures in the diaphragm chambers 15-16 will be almost balanced. The light spring 17 combined with the high pressure fluid acting beneath the valve 9 serves to maintain the latter in open position. Now, when the pressure rises in the control pipe 30 to a predetermined point, the valve 24 is closed so that the high pressure fluid passing through the bleed port 21 cannot escape to the low pressure side of the diaphragm, and high pressure fluid bleeds into and builds up in the high pressure diaphragm chamber 15, and, due to the escape of fluid from the low pressure diaphragm chamber 16 through the bleed port 26, the diaphragm 14 is raised against the spring 17 and against the pressure of high pressure fluid beneath the valve 9, and the latter is thus closed. During the closing movement, the bleed port 26 acts somewhat in the nature of a dash-pot, and the valve 9 is closed with a relatively steady action so that there will be no chattering or hunting of the valve 9. As soon as the pressure in the control pipe 30 lowers so as to permit the valve 24 to be raised from its seat, the high pressure fluid from the high pressure diaphragm chamber 15 passes into the low pressure diaphragm chamber 16, and the valve 9 is again opened.

I have found that with a regulating valve as above described, a very slight differential of pressure may be maintained between the high pressure side 6 and the low pressure side 7 of the valve casing. The valve is responsive to the most exacting requirements of use, but, due to the relatively slow movement of the diaphragm 14 under the dash-pot action, the operation of the valve is exceedingly smooth and satisfactory.

In order to guard against accident which might be occasioned by a high pressure in the low pressure side 7 of the valve, I prefer to employ the relief valve 27. This valve is usually set to release at the maximum pressure desired in the low pressure side 7 of the valve. If for any reason a high pressure should be developed in the low pressure side 7 of the valve, such pressure would build up in the low pressure diaphragm chamber 16, but the relief valve 27 would then immediately release the pressure faster than it could build up through the port 26 so that the high pressure fluid in the diaphragm chamber 15 would immediately close the valve 9 and prevent injury.

In Fig. 3 I have shown a relief valve which under certain conditions it is desirable to use in place of the relief valve 27 in Fig. 1. When the relief valve of Fig. 3 is used in place of the valve 27, the inlet pipe 55 is connected at 56 to the low pressure side of the diaphragm. The outlet pipe 57 of the relief valve may connect to the atmosphere or other region of low pressure, such as the low pressure side of the valve 5. The valve disk 58 seats with the pressure and is preferably urged in the closing direction by a spring 59. The valve disk 58 may be further urged toward closed position by adjustable means such as springs 60—60 engaging a yoke 61 connected to the valve stem 62.

The relief valve disk 58 may be urged to open position against the springs 59—60 (when both are used) by means of a diaphragm 63. The pressure side of the diaphragm is connected through the connection 64 with the low pressure side of the valve or the region of whatever pressure is to be controlled. Thus, when the pressure upon the pressure side of the diaphragm reaches the predetermined point (determined by adjustable springs 60—60) sufficient to move the valve 58 from its seat, pressure fluid is immediately vented from the low pressure side 16 of the main diaphragm chamber through the inlet pipe 55 and the outlet pipe 57 with the result that the high pressure fluid in the high pressure diaphragm chamber 15 will maintain the main valve 9 in closed position. By employing a relief valve as shown in Fig. 3, a remote control is possible and adjustment of the predetermined pressure may be readily made.

Figure 2:
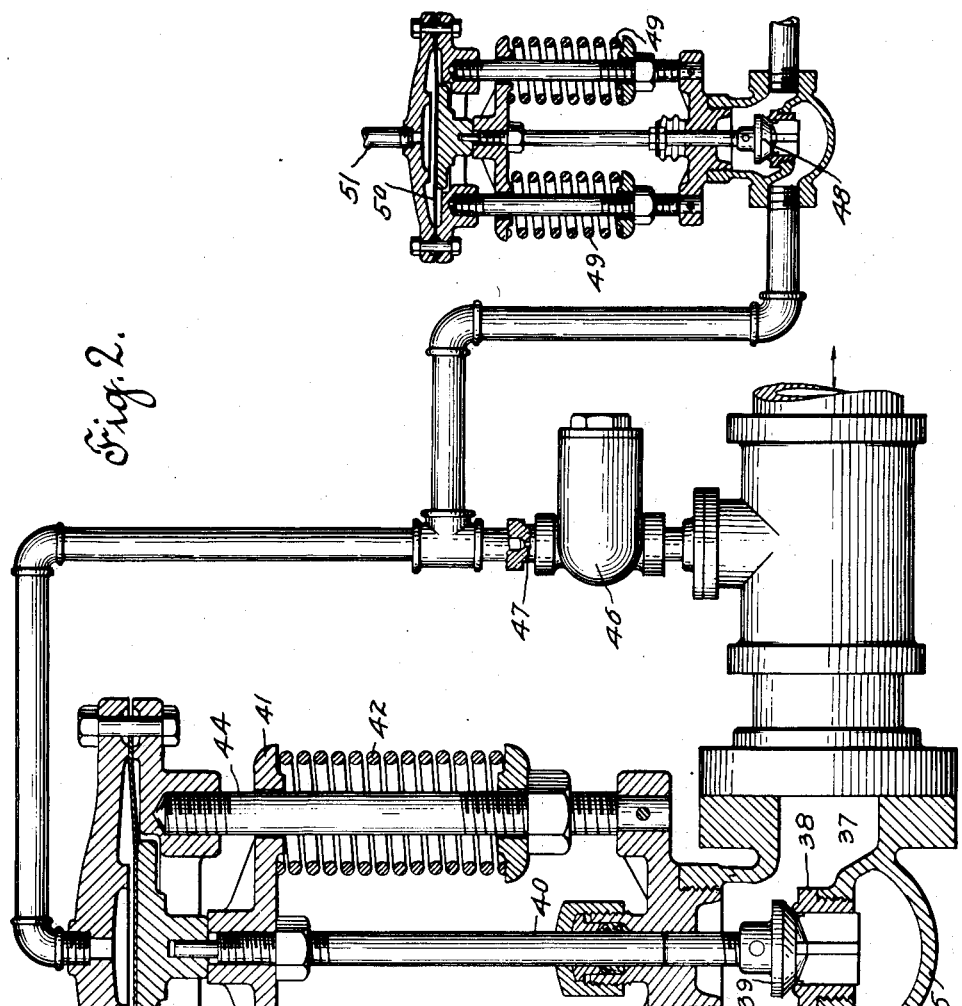
Fig. 2 is a similar view illustrating a different form of the invention.

The valve illustrated in Fig. 2 is so designed that only low pressure fluid reaches the diaphragm, and the parts may therefore be built of relatively light material. As shown in Fig. 2, the valve casing 35 has a high pressure side 36 and a low pressure side 37 communicating with each other through the valve seat 38, and the passage of fluid is controlled by a valve member 39. A valve stem 40 passes upwardly and is secured to a cross member 41, which is urged upwardly by springs 42—42. A diaphragm casing 43 is supported above the valve stem 40 as by means of the bolts 44—44. The diaphragm 45 in the diaphragm casing serves to actuate the valve stem 40 and move the same downwardly so as to close the valve against the springs 42—42.

The diaphragm 45 is acted upon only by low pressure fluid. In the form shown, a low pressure connection is made between the low pressure side 37 of the valve casing and the diaphragm casing 43. This connection includes a strainer 46 and a fitting having a small bleed port 47. Low pressure fluid may pass through the bleed port 47 and into the diaphragm casing 43 so as to build up a low pressure above the diaphragm 45 and thus close the valve 39 and stop the flow of fluid. During the normal operation of the regulating valve when the valve 39 is open, fluid passes through the bleed connection 47 and exhausts past a control valve 48, and thence to the atmosphere or other region of lower pressure. The valve 48 is urged away from its seat by springs 49 and is moved to closed position under the influence of the diaphragm 50. The flow of fluid past the valve 39 may be controlled from a remote point by any suitable means which actuates the control valve 48. In the pressure control system shown, the pressure in the control pipe 51 determines the position of the valve 48.

The operation of the valve shown in Fig. 2 is in general similar to that heretofore described. With the parts in closed position as illustrated in the drawings, there will be no flow of fluid past the main valve 39. Now, when the control valve 48 is opened, for example by a drop of pressure in the control line 51, low pressure fluid from the diaphragm casing 43 and low pressure fluid passing through the bleed port 47 exhausts to the atmosphere or other region of low pressure, and the springs 42—42 then raise the main valve 39 from its seat, and a flow of fluid through the main valve is then established. A rise in pressure in the control pipe 51 serves to close the control valve 48 and permit a pressure to be built up above the diaphragm 45 and then again close the main valve 39. The diaphragm in the present construction is subjected only to low pressure fluid and may therefore be built of relatively light material.

Figure 4:
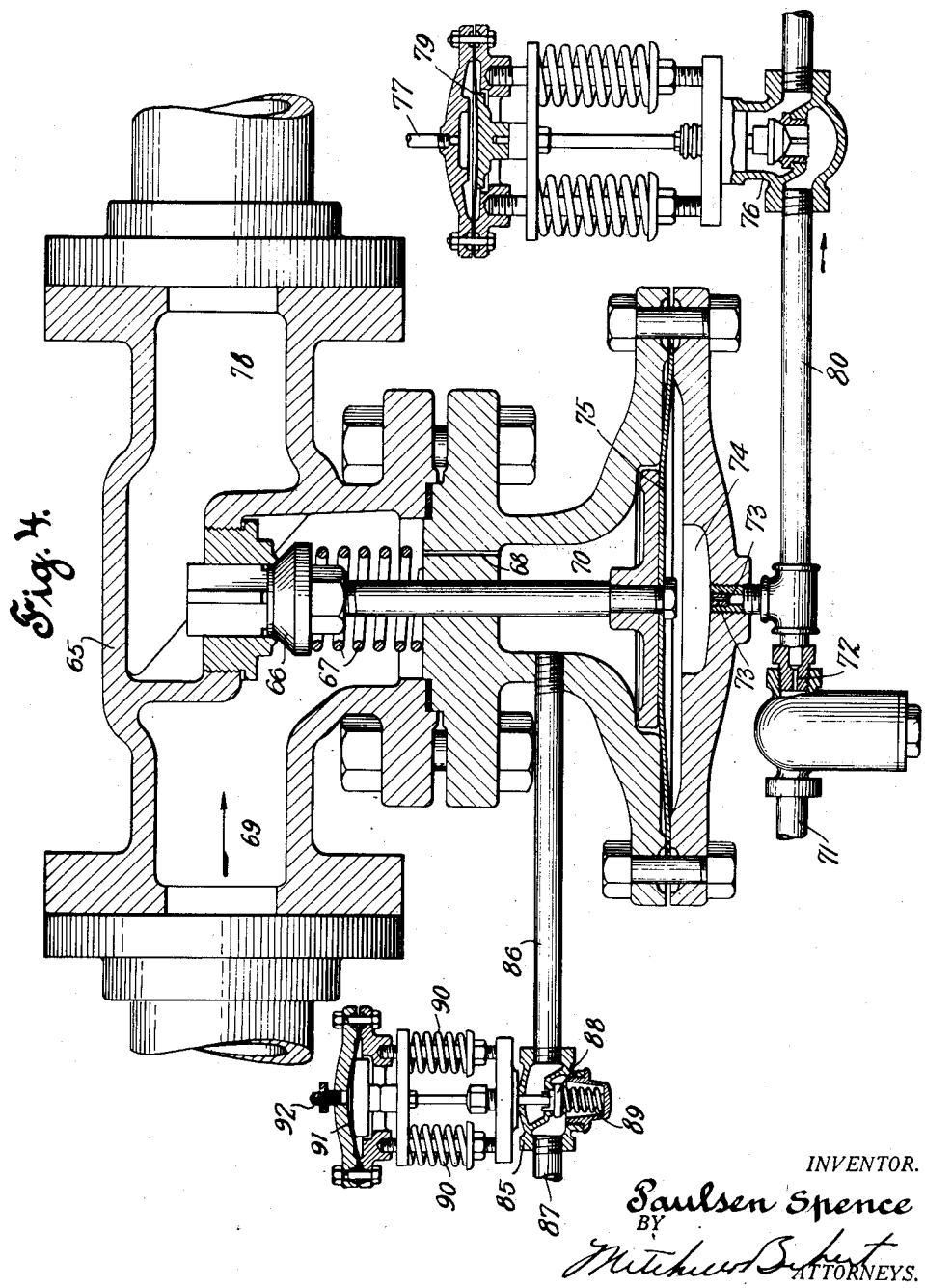
Fig. 4 is a view similar to Fig. 1, but illustrating a modification.

In that modified form of the invention shown in Fig. 4, the main valve casing 65 is substantially the same as that shown in Fig. 1 except that the valve 66 closes with the pressure and in addition is urged toward closed position by means of a spring 67. A bleed connection 68 leads from the high pressure side 69 of the valve casing to the upper diaphragm chamber 70. High pressure fluid preferably from the high pressure side of the main valve is conducted through the pipe 71 through a restricted fitting 72 and a second restricted fitting or nipple 73 to the lower diaphragm chamber 74. Thus, both sides of the diaphragm 75 are subjected to high pressure fluid.

The pressure in the diaphragm chamber 74 is controlled by a pilot valve 76, which may be substantially the same as that shown in Figs. 1 and 2, and the construction of which need not be further described. The control pipe 77 of the pilot valve 76 may be connected to the low pressure side 78 of the valve 65 or to any other region the pressure of which is to be controlled. Thus, when the pressure in the control pipe 77 and consequently upon the diaphragm 79 falls below a predetermined point (as determined by the spring adjustment of the valve 76), the valve will be opened and pressure fluid will be vented from the diaphragm chamber 74 through the pipe 80, valve 76, and thence to the low pressure side of the valve 65 or other region of low pressure. The high pressure fluid in the diaphragm chamber 70 will then overcome the spring 67 and move the main valve 66 to open position. When the pressure in the pilot control pipe 77 rises to a predetermined point, the pilot valve is closed and high pressure fluid bleeding in from the pipe 71 builds up in the lower diaphragm chamber 74, and, since the fluid in the diaphragm chamber 70 is also high pressure fluid, as soon as the pressures on the opposite side of the diaphragm are almost balanced, the spring 67 forces the main valve 66 into closed position.

In order to obviate the possibility of having the main valve 66 remain open, for example, due to a failure of the pilot valve 76 to act and thus put a dangerously high pressure on the low pressure side 78 of the main valve 65, I prefer to provide vent means for the upper diaphragm chamber 70. In the form shown I employ a relief valve 85 connected to the diaphragm chamber 70 by a pipe 86 and venting through a pipe 87 to the atmosphere or other region of lower pressure. The valve 85 includes a valve member or disk 88 which may be urged toward closed position by means of a spring 89 and also by adjustable springs 90—90 tending to close the valve 88. The valve member 88 is moved toward open position by means of a diaphragm 91 to be acted upon by pressure fluid entering through the fluid connection 92. This connection 92 may be in communication with the low pressure side 78 of the main valve or other region where it is desired to maintain the pressure. Thus, if through accident or otherwise the pressure in the low pressure side 78 of the main valve 65 should reach an upper predetermined limit, pressure fluid passing through the connection 92 will move the diaphragm 91 so as to open the vent valve 88 against the pressure of the springs so as to vent the upper diaphragm chamber 70 and permit the high pressure fluid beneath the diaphragm to close the main valve 66. If for any reason there should be but slight pressure in the diaphragm chamber 74 the valve 66 would still be closed by the spring 67 as soon as the pressure in the diaphragm chamber is vented through the relief valve 85. The relief valve 85 is of such capacity that all fluid entering through the bleed connection or port 68 will be rather freely vented and there is no possibility of the valve 66 being held open with consequent danger of overpressure on the low pressure side of the valve.

In all of the valves herein shown I prefer to place the pipe connections so that (when steam is employed) condensate will collect in the diaphragm chambers and, due to the comparatively small bleed ports, the diaphragms will move slowly and with a dashpot action, thus avoiding chattering and other disadvantages. While the control valves herein have been shown as pressure operated it will be readily understood that thermostatic or other controls may be employed.

While the invention has been described in considerable detail and various modifications and embodiments have been shown, I do not wish to be strictly limited to the illustrative forms herein shown, since changes may be made within the scope of the invention as defined in the appended claims.

I claim:

1. In a regulating valve, a valve having a high pressure side and a low pressure side, a valve member, a diaphragm for actuating said valve member, bleed means for bleeding high pressure fluid to one side of said diaphragm, and a control valve for normally venting the high pressure bled fluid, means for leading said vented fluid to the opposite side of said diaphragm and bleeding therefrom into the low pressure side of said valve.

2. In a regulating valve, a valve having a high pressure side and a low pressure side, a valve member, a diaphragm for actuating said valve member, bleed means for bleeding high pressure fluid to one side of said diaphragm, an automatic control valve for venting the high pressure bled fluid, and means for leading said vented fluid to the opposite side of said diaphragm and bleeding therefrom into the low pressure side of the regulating valve, said control valve comprising a casing, a spring actuated valve member, a diaphragm within said casing and connected to said valve member, and a pipe connection to said casing for leading fluid under pressure to one side of said last mentioned diaphragm.

3. In a regulating valve, a valve having a high pressure side and a low pressure side, a valve member, a diaphragm for actuating said valve member, bleed means for bleeding high pressure fluid to one side of said diaphragm, an automatic control valve for venting the high pressure bled fluid, means for leading said vented fluid to the opposite side of said diaphragm and bleeding therefrom into the low pressure side of the regulating valve, and an automatic relief valve for relieving the pressure on said opposite side of said diaphragm, said relief valve comprising a casing, a spring actuated valve member, a diaphragm within said casing and connected to said valve member, and a pipe connection to said casing for leading fluid under pressure to one side of said last mentioned diaphragm.

4. In a regulating valve, a valve having a high pressure side and a low pressure side, a valve member, a diaphragm for actuating said valve member, bleed means for bleeding high pressure fluid to one side of said diaphragm, an automatic control valve for venting the high pressure bled fluid, means for leading said vented fluid to the opposite side of said diaphragm and bleeding therefrom into the low pressure side of the regulating valve, and an automatic relief valve, said relief valve being adapted to relieve the pressure on said opposite side of said diaphragm when it exceeds a predetermined limit so as to permit the regulating valve to close.

PAULSEN SPENCE.